2,790,747
Patented Apr. 30, 1957

2,790,747

ZIRCONIUM CONTAINING ANTI-PERSPIRANT COMPOSITIONS

Frank M. Berger, Princeton, and Sophie L. Plechner, Metuchen, N. J., assignors to Carter Products, New York, N. Y., a corporation of Maryland No Drawing. Application August 6, 1952,
Serial No. 303,001

5 Claims. (Cl. 167—90)

This invention relates to perspiration retarding or inhibiting compositions and more particularly to effective compositions for this purpose which incorporate compounds of zirconium.

It is desirable to provide compositions that will inhibit or prevent the flow of perspiration from limited areas of the human skin for limited time intervals. Although the action of such compositions is not fully understood, it is known that to be effective, they must be water-soluble. It is further known that many compositions that are otherwise effective for this purpose are undesirable because they irritate the skin or attack and deteriorate clothing fibers with which they come in contact, particularly when the fabrics are subjected to high temperatures, as in ironing. Many known compositions are subject to both of these objections. Our improved compositions are harmless to both the skin and fabrics.

There are three principal classes of zirconium salts, none of which is useful as a perspiration inhibiting composition. By the term "perspiration inhibiting or retarding composition," we mean compositions, the essential action of which is to stop or retard the flow of perspiration from the human skin, and not compositions that merely mask or destroy odors of or that result from perspiration flow. The three classes of zirconium salts are, first, the soluble inorganic acid salts, typical of which are zirconium sulfate, zirconium chloride, and zirconium oxychloride; second, the relatively soluble zirconium salts of hydroxy aliphatic carboxylic acids, typical of which are sodium zirconium lactate, sodium zirconium glycolate and sodium zirconium gluconate; and third, the relatively insoluble zirconium salts of hydroxy aliphatic carboxylic acids typical of which are zirconium lactate, zirconium glycolate and zirconium gluconate. The inorganic acid salts of zirconium, although quite soluble in water, produce solutions that are so highly acidic as to intensely irritate the skin and cause acid burns, and for this reason their perspiration inhibiting properties, if in fact they possess any, cannot be evaluated and they are useless for retarding and inhibiting perspiration flow.

We have discovered that highly effective perspiration inhibiting compositions can be prepared by combining zirconium salts from the second and third classes enumerated above. Thus, we have found that highly effective perspiration inhibiting compositions can be prepared by employing as the active ingredients thereof a mixture of one or more zirconium salts taken from the class comprising the relatively soluble salts of hydroxy aliphatic carboxylic acids and one or more zirconium salts taken from the class comprising the relatively insoluble salts of hydroxy aliphatic carboxylic acids. With this combination of compounds serving as its sole active constituent, there is produced a composition which not only stops or effectively retards the flow of perspiration from treated areas of the skin, but which is non-irritating to the skin and non-injurious to fabrics. This result is particularly surprising since neither of the active ingredients alone is effective to inhibit the flow of perspiration.

For effective use, the active ingredients of the compositions of this invention should be combined in water or in an aqueous carrier, such as the aqueous phase of a cream, emulsion or lotion.

Compositions in accordance with our invention are effective over a wide range of proportions as between the relatively soluble and the relative insoluble organic zirconium salts. Thus, for example, when combining sodium zirconium lactate and zirconium lactate, the proportions may range from about 90% sodium zirconium lactate with 10% zirconium lactate to about 10% or less of sodium zirconium lactate with 90% or more of zirconium lactate. Similar ranges of proportions may be used in combining the sodium zirconium glycolate or sodium zirconium gluconate with the relatively insoluble zirconium salts of organic acids. We generally prefer to employ such proportions of the essential active ingredients as will produce a composition having a pH value substantially within the range of about 2.5 to 5.5. Aqueous mixtures exhibiting pH values within this range are, for example, obtained by combining the ingredients in the proportions from about 60% sodium zirconium lactate with about 40% zirconium lactate to less than 10% sodium zirconium lactate with over 90% zirconium lactate. The range of proportions of the other relatively soluble and relatively insoluble zirconium salts of organic acids which give pH values within the preferred range may be readily determined.

Our improved anti-perspirant compositions may be prepared in any desired form, including solutions, emulsions, lotions, creams, and the like, which include an aqueous carrier. One useful form comprises simple water solutions of the active ingredients. Suitable formulations of water solutions may include from 60% to 85% water and the remainder a mixture of the relatively soluble and relatively insoluble organic zirconium salts in the proportions indicated above. Specific examples of such water solution preparations follow, the ingredients being given in percentage by weight.

*Example I*

| | Percent |
|---|---|
| Sodium zirconium lactate | 30 |
| Zirconium lactate | 4 |
| Water | 66 |

*Example II*

| | Percent |
|---|---|
| Sodium zirconium glycolate | 15 |
| Zirconium glycolate | 5 |
| Water | 80 |

*Example III*

| | Percent |
|---|---|
| Sodium zirconium lactate | 30 |
| Zirconium glycolate | 5 |
| Water | 65 |

Our novel combination of active ingredients can be incorporated into cream bases which will maintain the compositions in contact with the skin over extended periods. The cream base forming materials may vary widely in composition but will generally comprise an oily phase held in dispersion by a suitable emulsifier in an aqueous phase which carries the combined zirconium salts, a humectant also preferably being present.

The oily phase of the base may include natural and synthetic oils, waxes and fats, including spermaceti, paraffin, mineral oils, sterols, vegetable oils, and other esters of fatty acids. The emulsifier may comprise any suitable known emulsifying agent, and those found useful include partial esters of fatty acids with glycerine, glycol, or other polyhydric alcohols and their polyoxyethylene ethers, including stabilizers such as sodium salts of sulfated monoglycerides of cocoanut oil fatty acids, sodium alkyl sulfates, salts of alkyl aromatic sulfonates, etc. Specific emulsifiers suitable for use in the cream base include sodium β-oleylethane amidsulfonate (obtainable under the trade name "Igepon T"), sorbitan monolaurate, monopalmitate, and monostearate polyoxyethylene derivatives (obtainable under the trade names "Tween 20" to "Tween 80"), alkylated aryl polyether alcohol (obtainable under the trade name "Triton X45"), and the triethanolamine salt of alkyl aryl sulfonate (obtainable under the trade name "Ultrawet 60L"). Suitable humectants include glycerine, sorbitol and propylene glycol.

The following are specific examples of cream preparations incorporating our novel perspiration inhibiting composition, the proportions of ingredients being given in approximate percentages by weight.

*Example IV*

|  | Percent |
|---|---|
| Petrolatum | 1 |
| Spermaceti wax | 3 |
| Glycerol monostearate | 13 |
| Glycerine | 10 |
| Water | 44 |
| Triethanolamine salt of alkyl aryl sulfonate | 10 |
| Sorbitan monostearate polyoxyethylene derivative | 3 |
| Titanium dioxide | 1 |
| Zirconium lactate | 5 |
| Sodium zirconium lactate | 10 |

*Example V*

|  | Percent |
|---|---|
| Petrolatum | 1 |
| Spermaceti wax | 3 |
| Glycerol monostearate | 13 |
| Glycerine | 10 |
| Water | 44 |
| Triethanolamine salt of alkyl aryl sulfonate | 10 |
| Sorbitan monostearate polyoxyethylene derivative | 3 |
| Titanium dioxide | 1 |
| Zirconium glycolate | 5 |
| Sodium zirconium glycolate | 10 |

*Example VI*

|  | Percent |
|---|---|
| Petrolatum | 2 |
| Spermaceti wax | 2 |
| Glycerol monostearate | 9 |
| Glycerine | 12 |
| Water | 52 |
| Polyethylene glycol monostearate | 5 |
| Sorbitan monopalmitate polyoxyethylene derivative | 2 |
| Titanium dioxide | 1 |
| Sodium zirconium lactate | 10 |
| Zirconium lactate | 5 |

Although we have given a number of specific examples of compositions embodying our invention, it should be understood that the invention is not limited to these examples but includes all such compositions as fall within the scope of the appended claims.

We claim:

1. A perspiration inhibiting preparation comprising the combination, in an aqueous carrier, of at least one zirconium salt selected from the class consisting of sodium zirconium lactate, sodium zirconium glycolate and sodium zirconium gluconate and at least one zirconium salt selected from the class consisting of zirconium glycolate and zirconium gluconate, said preparation having a pH in the range of 2.5 to 5.5.

2. A perspiration inhibiting preparation as defined in claim 1, in which the aqueous carrier comprises the aqueous phase of a cream in which an oily phase is held in dispersion by an emulsifier.

3. A perspiration inhibiting preparation comprising the combination, in an aqueous carrier, of sodium zirconium glycolate and zirconium glycolate, said preparation having a pH in the range of 2.5 to 5.5.

4. A perspiration inhibiting preparation comprising the combination, in an aqueous carrier, of sodium zirconium gluconate and zirconium gluconate, said preparation having a pH in the range of 2.5 to 5.5.

5. A perspiration inhibiting preparation comprising the combination, in an aqueous carrier, of sodium zirconium lactate and zirconium glycolate, said preparation having a pH in the range of 2.5 to 5.5.

References Cited in the file of this patent

UNITED STATES PATENTS

| 2,236,387 | Wallace | Mar. 25, 1941 |
| 2,498,514 | Van Mater | Feb. 21, 1950 |

FOREIGN PATENTS

| 237,624 | Germany | Aug. 23, 1911 |